(No Model.)
S. A. EKEHORN.
COLLAPSIBLE TAP.
No. 533,585. Patented Feb. 5, 1895.
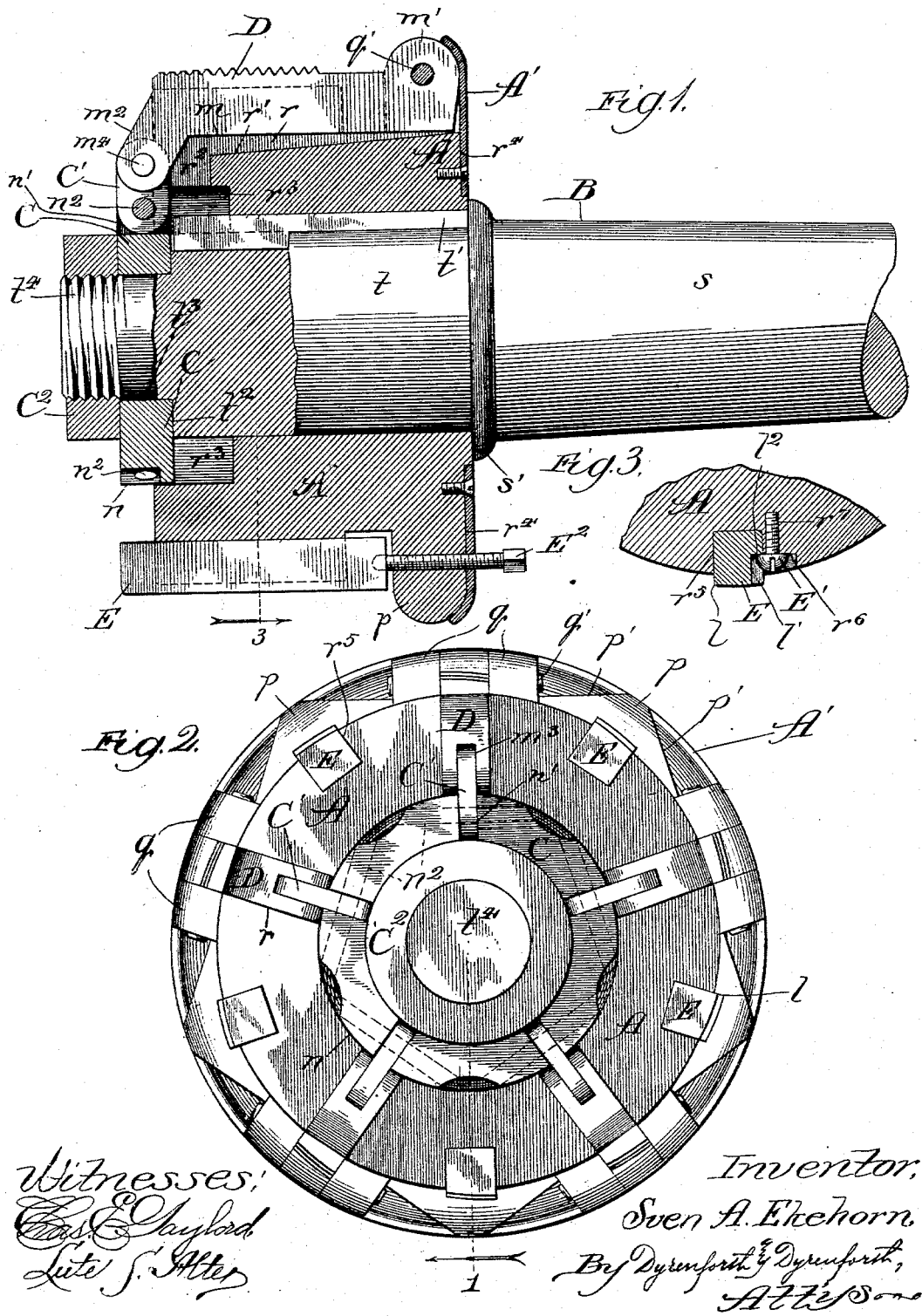
Witnesses:
Chas. E. Gaylord
Lute J. Alter
Inventor:
Sven A. Ekehorn
By Dyrenforth & Dyrenforth
Attys

UNITED STATES PATENT OFFICE.

SVEN A. EKEHORN, OF MILWAUKEE, WISCONSIN.

COLLAPSIBLE TAP.

SPECIFICATION forming part of Letters Patent No. 533,585, dated February 5, 1895.

Application filed October 29, 1894. Serial No. 527,136. (No model.)

*To all whom it may concern:*

Be it known that I, SVEN A. EKEHORN, a citizen of the United States, residing at Milwaukee, in the county of Milwaukee and State of Wisconsin, have invented a new and useful Improvement in Collapsible Taps, of which the following is a specification.

My invention relates to improvements in collapsible taps of the class designed for use in cutting internal threads in the ends of tubes. The object of rendering the tap collapsible is to permit its removal from the work without reversal of motion, whereby the operation of withdrawal may be accomplished quickly and without danger of injuring the thread.

Taps of the class to which my invention relates are so constructed that the expansion of the cutters is produced by pressure of the tool in the direction of forcing the tap into the tube, and retraction of the cutters is brought about by force applied to withdraw the tap longitudinally from the tube. It frequently happens in the use of taps of this class, as hitherto constructed, that loose particles of metal will lodge beneath the cutters and thus prevent collapsing of the latter, with the result that in attempting to withdraw the tool the threads become injured.

My object is to provide a tap, in the use of which there shall be no danger of particles of metal interfering with the collapsing movement of the cutters; and my object is, further, to provide other improvements in the construction of the tap, all to the end of rendering it particularly strong and durable and desirable for its purpose.

In the drawings, Figure 1 is a broken view of the tool showing its head portion in section, the section being taken on line 1 of Fig. 2 and viewed in the direction of the arrow; Fig. 2, a front elevation of the tool, and Fig. 3 a broken section taken on line 3 of Fig. 1 and viewed in the direction of the arrow.

A is the head of the tool, and B a stem having a cylindrical neck $t$ and tapering shank $s$ separated by an annular collar or stop-portion $s'$. The head A is a solid annular block of metal fitting closely but loosely at its inner circumference upon the cylindrical neck $t$ of the stem B. The head is provided in its inner circumference with a groove to receive a spline $t'$ on the stem, the relation between the parts A and B being such that the head may slide longitudinally upon the neck-portion $t$, but is held thereto by the spline against independent rotation.

In the outer circumference of the head A, as illustrated, are five longitudinally extending recesses $r$ parallel with each other and equi-distant apart. The recesses extend entirely across the head, from front to back, and at their rear ends are flanked by bearing projections or ears $q$. Forward of the ears $q$ the head A is cylindrical, but at the ears the head is formed with lugs or projections $p$ having straight sides $p'$ which give to the rear portion of the head the appearance of a regular pentagon. The recesses $r$ have bases $r'$ inclined inward from the rear toward the forward side of the head, and in the front side are sockets or recesses $r^2$ registering with the recesses $r$. In its face the inner circumference of the head A is enlarged for a comparatively short distance backward to present an annular recess $r^3$. The five recesses $r$ $r^2$ are of the same shape and dimensions. The stem $t$ at its forward end portion is reduced to present an annular shoulder $t^2$, beyond which is a smooth annular surface $t^3$, and beyond the latter a thread $t^4$.

Fitting upon the smooth surface $t^3$ against the shoulder $t^2$ is a collar C, which, at its outer circumferential face $n$, fits the circumferential wall of the recess $r^3$. Extending in the recesses $r$ are five thread cutters D. Each cutter D is formed with straight sides and a straight under surface $m$. It is enlarged at its rear end $m'$ and rounded to conform to the shape of the ears $q$; and at its forward end it has an inward projecting bifurcated arm or lug $m^2$ rounded at the end. In the collar C are five recesses $n'$ which register with the sockets $m^3$ in the bifurcated ends of the cutter-bars D. Pivotally mounted in the recesses $n'$ on pins $n^2$ are links C' which extend into the sockets $m^3$ of the cutter-bars and are there pivotally secured by means of pins $m^4$. The collar C is held securely against the shoulder $t^2$ by means of a nut $C^2$ on the threaded end $t^4$ of the stem. The cutter-bars are pivotally mounted at their ends $m'$ between the ears $q$ on pins $q'$, and they fit exactly between the walls of the sockets $r$ but in a manner to swing freely therein.

The relative adjustment of the parts is such that when they are in the position shown in Fig. 1, wherein the stop $s'$ on the stem engages the rear face of the head A, the links C' are extended at right-angles to the stem, and the swinging ends of the cutter-bars are forced outward to extend at their thread-cutting edges beyond the adjacent circumferential face of the head.

The stem B may be withdrawn in the head, in the backward direction, until the collar C entering the recess $r^3$ strikes the base of the latter. In the backward movement of the stem and collar the links are drawn backward to swing the free ends of the cutter-bars radially inward until their under surfaces $m$ engage the inclined bases $r'$ of the sockets, whereby the tap is collapsed.

The rear surface of the head A is formed with an annular recess $r^4$ fitted with an annular plate or disk A' which curves at its circumference over the rear faces of the ears $q$ and ends $m'$ of the cutter-bars.

As before stated, the collar C fits exactly the recess $r^3$ and the cutter-bars fit exactly the sockets $r$. The links C' fit exactly the recesses in the collar and cutter-bars, so that in the cutting operation of the latter no particles of metal can work their way between relatively moving surfaces to lodge in the sockets or recesses and clog the latter.

The plate A' operates as a shield to prevent particles of metal or dust from penetrating from the back to spaces beneath the cutter-bar. Thus the sockets and recesses, into and out of which the cutter-bars move, are dust-proof, and there can be no danger of the tap failing to collapse when the stem B is drawn in the backward direction in the head A.

Parallel with the recesses $r$ and intermediate thereof are five recesses $r^5$ to receive reaming bits or bars E which project slightly beyond the circumferential face of the head A. The forward edge $l$ of each bar E is sharpened to afford a cutting edge, and in the rear edge of each said bar is a recess $l'$ presenting a shoulder $l^2$. On the side of each recess $r^5$ is a countersink $r^6$ and tap $r^7$ for a clamp-screw E' which may be tightened against the shoulder $l^2$ of each bar E to hold it in place. Extending through each projection $p$ to the respective recesses $r^5$ is a threaded opening for an adjusting-screw $E^2$. The adjusting screws $E^2$ engage the rear ends of the bars E and by turning them the said bars may be adjusted to extend the desired distance in advance of the heads A and held in adjusted position.

In operation the tap mounted at its shank in a rotating support is pressed forward into the end of the tube to be provided with the screw-thread. In the rotation of the tool the reaming-bits E cut and smooth the inner surface of the tube. The inner circumference of the tube when cut and smoothed by the reamers will be of the same diameter approximately as the bases of the thread-cutting teeth on the bars D. The tool is pressed forward and rotated until the thread has been cut to the proper distance, when it will be withdrawn from the tube. In the initial movement of the stem in the backward direction, during the said withdrawing operation, the engagement of the teeth of the bars D with the thread formed in the tube will retard the head A until the bars D have been swung inward to the surfaces $r$. The thread cutting teeth are thus retracted within the cylindrical surface outlined by the reaming bars E, and the head may thus be withdrawn longitudinally without danger of injury to the thread which has been cut in the tube.

My improved tap is constructed with a view to great strength and durability and will always be certain in its action. When it is desired to sharpen or replace the reaming bars they may be readily removed by loosening the set-screws E'; and the pins $q'$, $m^4$ and $n^2$ may be quickly knocked out and replaced when it is desired to remove and replace the thread-cutting bars D.

While the particular details illustrated and described and the particular manner in which they are co-operatively combined are preferred, the mechanism may be variously modified without departing from the spirit of my invention as defined by the claims.

What I claim as new, and desire to secure by Letters Patent, is—

1. In a collapsible tap, the combination of an annular head, a stem in, and movable with relation to, said head, pivotal links upon the stem, and thread-cutting bars pivoted at one end-portion to the head and at their opposite end-portions to the said links, substantially as and for the purpose set forth.

2. In a collapsible tap, an annular head, a stem in, and movable with relation to, said head, pivotal links upon the stem, thread-cutting bars pivoted at one end-portion to the head and at their opposite end-portions to the said links, and reaming bars secured to the head between the thread-cutting bars, all combined to operate substantially as and for the purpose set forth.

3. In a collapsible tap, a stem having a cylindrical neck-portion, a stop at one end and a collar at the opposite end of said neck-portion, an annular head provided with recesses and feathered upon the said neck portion to slide longitudinally thereon between said stop and collar, links pivoted to the collar, and thread-cutting bars extending in said recesses and pivoted at one end to the head and at their opposite ends to the said links, all combined to operate substantially as and for the purpose set forth.

4. In a collapsible tap, a stem having a cylindrical neck-portion, a stop at one end and a collar at the opposite end of said neck-portion, an annular head provided with recesses and feathered upon the said neck-portion to slide longitudinally thereon between said stop and collar, links pivoted to the collar, thread-cutting bars extending in said recesses and pivoted at one end to the head and at their opposite ends to the said links, and reaming-bars secured to the head between the cutting-bars, all combined to operate substantially as and for the purpose set forth.

5. In a collapsible tap, the combination of a stem B having the shank-portion $s$, neck-portion $t$ and stop $s'$, a collar C on the forward end of the neck-portion, an annular head A feathered upon the said neck-portion and provided with recesses $r$ having inclined bases $r'$ and intermediate recesses $r^5$, the head having an inner circumferential recess $r^3$ to receive the said collar on the stem, and the head being movable on the stem in one direction against the said stop $s'$ and in the opposite direction to engage the collar with the base of its recess $r^3$, thread-cutting bars D pivotally mounted at their rear ends in the rear end-portions of the sockets $r$, pivotal links upon the said collar pivotally connected at their free ends with the forward ends of the bars D, and reaming-bars E in the recesses $r^5$, all constructed and arranged to operate substantially as and for the purpose set forth.

6. In a collapsible tap, an annular head, having recesses $r$, a stem in and moving with relation to said head, pivotal links fastened upon the stem, thread-cutting bars D closely fitting the recesses $r$ and pivotally connected at their rear end portions to the rear end portion of the head and pivotally connected at their forward end portions to the said links, and an annular shield A' on the rear end of the head extending over the rear end portions of the bars D, all constructed to operate substantially as and for the purpose set forth.

7. In a collapsible tap, a stem B having a neck-portion $t$, a collar C on said neck-portion, links C' pivoted to the collar, an annular head A having recesses $r$, and feathered upon said neck-portion and movable longitudinally thereon, thread-cutting bars D in the recesses $r$ and pivotally connected at their rear end-portions to the head and at their opposite end portions to the said links, the head having the recesses $r^5$ intermediate of the recesses $r$, reaming bars E in the recesses $r^5$, adjusting-screws $E^2$ extending through the rear portions of the head against the bars E, and means for fastening the said bars in adjusted position, all constructed and arranged to operate substantially as and for the purpose set forth.

SVEN A. EKEHORN.

In presence of—
T. J. RICHTER,
FERDINAND RICHTER.